US009136072B2

(12) United States Patent
Yuasa et al.

(10) Patent No.: US 9,136,072 B2
(45) Date of Patent: Sep. 15, 2015

(54) INDICATOR APPARATUS

(75) Inventors: Eiji Yuasa, Tokyo (JP); Tatsuhito Ishii, Mie (JP); Motohiro Doi, Mie (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/389,705

(22) PCT Filed: Oct. 9, 2009

(86) PCT No.: PCT/JP2009/067644
§ 371 (c)(1), (2), (4) Date: Feb. 9, 2012

(87) PCT Pub. No.: WO2011/042986
PCT Pub. Date: Apr. 14, 2011

(65) Prior Publication Data
US 2012/0140479 A1 Jun. 7, 2012

(51) Int. Cl.
*G01D 11/28* (2006.01)
*H01H 9/18* (2006.01)
*E05B 17/10* (2006.01)
*H01H 13/02* (2006.01)
*H01H 9/02* (2006.01)

(52) U.S. Cl.
CPC ................ *H01H 9/182* (2013.01); *E05B 17/10* (2013.01); *H01H 13/023* (2013.01); *H01H 9/0235* (2013.01); *H01H 2219/06* (2013.01); *H01H 2219/0622* (2013.01)

(58) Field of Classification Search
CPC ... H01H 9/182; H01H 13/023; H01H 9/0235; H01H 2219/062; H01H 2219/0622; H01H 2219/06; E05B 17/10
USPC ........ 362/296.01, 23.01, 23.04, 23.05, 23.09, 362/23.1, 23.11, 23.12, 23.16, 23.17, 23.18, 362/100
See application file for complete search history.

(56) References Cited

U.S. PATENT DOCUMENTS 2,729,749 A * 1/1956 Heinz ........................ 250/466.1
5,477,432 A * 12/1995 Magic et al. .................... 362/26

(Continued)

FOREIGN PATENT DOCUMENTS

JP 59 113928 8/1984
JP 59 149178 10/1984

(Continued)

OTHER PUBLICATIONS

Machine translation of detailed description for JP 2002-053274.*

(Continued)

*Primary Examiner* — Diane Lee
*Assistant Examiner* — Naomi M Wolford
(74) *Attorney, Agent, or Firm* — Oblon, McClelland, Maier & Neustadt, L.L.P.

(57) ABSTRACT

In an indicator apparatus, a prism member includes: a prism member side surface; and a transmitting and reflecting surface that is inclined relative to the prism member side surface, and into which light from a light source is admitted. An adjacent member has an adjacent surface that is adjacent to the prism member side surface. The light from the light source is admitted into the transmitting and reflecting surface when the light source is lit, and passes through the prism member. If the prism member is viewed frontally when the light source is not lit, the adjacent surface is visible by optical reflection at the transmitting and reflecting surface.

13 Claims, 11 Drawing Sheets

(56) References Cited

U.S. PATENT DOCUMENTS

| | | | | |
|---|---|---|---|---|
| 2004/0066647 A1* | 4/2004 | Brady | 362/100 |
| 2006/0203485 A1 | 9/2006 | Fu et al. | |
| 2006/0219156 A1* | 10/2006 | Denton | 116/310 |

FOREIGN PATENT DOCUMENTS

| | | |
|---|---|---|
| JP | 60 156588 | 10/1985 |
| JP | 61 117401 | 7/1986 |
| JP | 5 273928 | 10/1993 |
| JP | 2002 53274 | 2/2002 |
| WO | WO2006011226 A1 | 2/2006 |

OTHER PUBLICATIONS

English translation of abstract for JP 05-273928.*

Yousef A. Gharbia and Jayantha Katapitiya, Loose abrasive blasting as an alternative to slurry polishing of opticle fibre end faces, International Journal of Machine Tools and Manufacture 43 (2003) 1413-1418.*

International Search Report Issued Jan. 12, 2010 in PCT/JP09/67644 Filed Oct. 9, 2009.

European Search Report dated Jan. 31, 2014, in European Patent Application No. 09850257.8.

* cited by examiner

INDICATOR APPARATUS

TECHNICAL FIELD

The present invention relates to an indicator apparatus that can be used in an elevator operating panel, for example.

BACKGROUND ART

In conventional elevator operating panels, a button frame that is made of a light-transmitting material is disposed between an outer perimeter of a button and a surface plate. A light source is disposed behind the button frame. Operational states of the button are made known to a user by the light source being switched on or off (see Patent Literature 1, for example).

In conventional indicators that are disposed on door panels of VTR devices, a metal coating is applied to a surface of a light-transmitting member by sputtering in order to impart a sense of integration with the door panel (see Patent Literature 2, for example).

CITATION LIST

Patent Literature

[Patent Literature 1]
Japanese Patent Laid-Open No. 2002-53274 (Gazette)
[Patent Literature 2]
Japanese Patent Laid-Open No. HEI 5-273928 (Gazette)

SUMMARY OF THE INVENTION

Problem to be Solved by the Invention

In conventional elevator operating panels such as those described above, the button frame is illuminated when the light source is lit, but the outward appearance of the button frame itself is visible when the light source is not lit, reducing decorative design. In answer to that, methods in which a metal coating is formed on the surface of the button frame are also conceivable, but in that case manufacturing costs are increased. Particularly with parts that are relatively large in size such as parts that are used in elevator operating panels, the number of parts that can be accommodated simultaneously inside a vacuum chamber is small, making manufacturing efficiency low and costs high. If a metal coating is applied, it is also necessary to apply a protective film so as to not to be peeled off even if handled directly. In addition, decorative design freedom is low if a metallic luster is simply imparted to the surface of the light-transmitting member.

The present invention aims to solve the above problems and an object of the present invention is to provide an indicator apparatus that can improve decorative design and decorative design freedom at reduced cost.

Means for Solving the Problem

In order to achieve the above object, according to one aspect of the present invention, there is provided an indicator apparatus including: a light source; a prism member including: a prism member side surface; and a transmitting and reflecting surface that is inclined relative to the prism member side surface, and into which light is admitted from the light source, the prism member transmitting the light from the light source; and an adjacent member that has an adjacent surface that is adjacent to the prism member side surface, wherein the adjacent surface is visible due to optical reflection at the transmitting and reflecting surface if the prism member is viewed frontally when the light source is lit.

EFFECTS OF THE INVENTION

In an indicator apparatus according to the present invention, since light passes through the prism member making the prism member appear to shine when the light source is lit, and the decorative design of the adjacent surface is visible in the prism member when the light source is not lit, the decorative design of the prism member when the light source is not lit can be made similar to the material, color, pattern, etc., of the adjacent surface, enabling decorative design and decorative design freedom to be improved at reduced cost.

DESCRIPTION OF EMBODIMENTS

Preferred embodiments of the present invention will now be explained with reference to the drawings.

Embodiment 1

Figure 1:
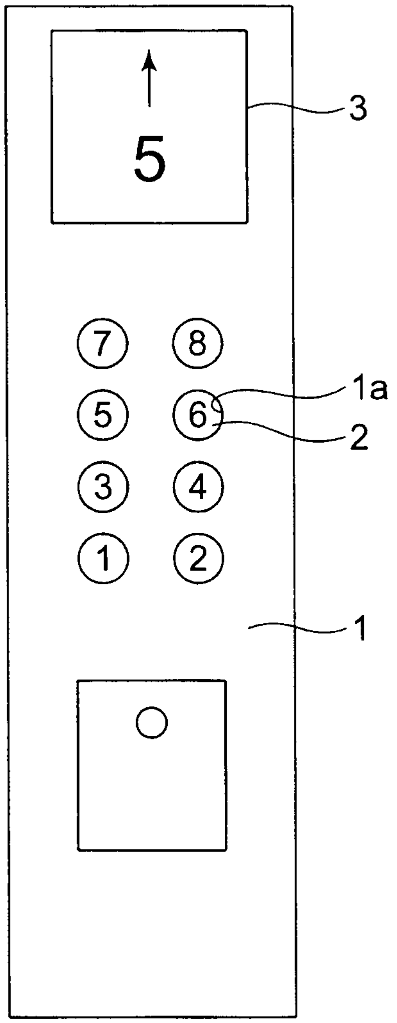
FIG. 1 is a front elevation that shows an elevator operating panel according to Embodiment 1 of the present invention.

FIG. 1 is a front elevation that shows an elevator operating panel that functions as an indicator apparatus according to Embodiment 1 of the present invention. In the figure, a plurality of circular button apertures 1*a* are disposed on a surface plate 1 that is made of a metal plate such as a stainless-steel plate, for example. Operating buttons 2 that are operated by users are disposed inside each of the button apertures 1*a*. A liquid crystal display 3 is disposed on an upper portion of the surface plate 1.

Figure 2:
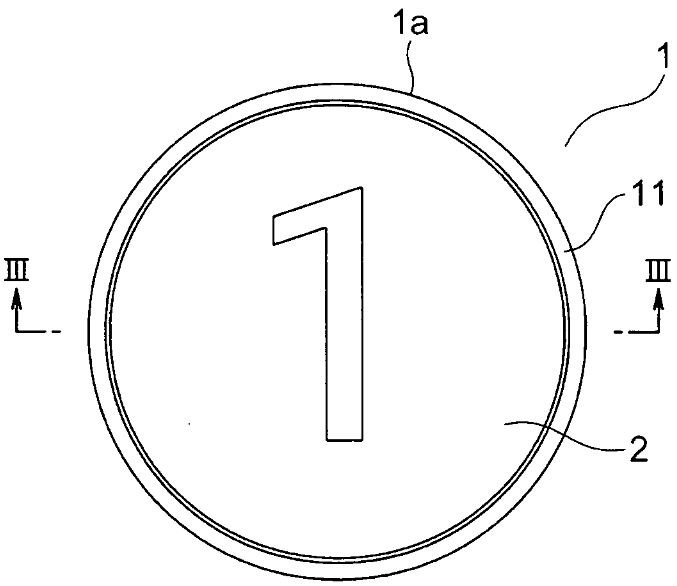
FIG. 2 is a front elevation that shows the operating button from FIG. 1 enlarged.
Figure 3:
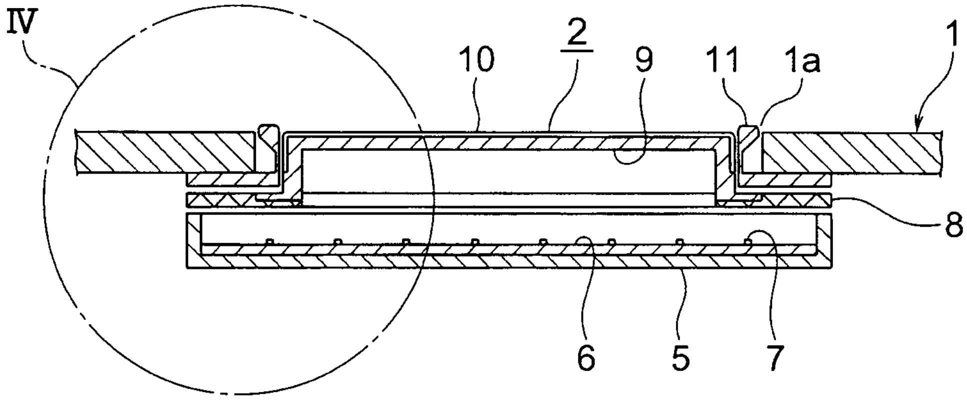
FIG. 3 is a cross section that is taken along line III-III in FIG. 2.

FIG. 2 is a front elevation that shows the operating button 2 from FIG. 1 enlarged, and FIG. 3 is a cross section that is taken along line III-III in FIG. 2. In the figures, a button unit 5 is disposed behind the surface plate 1. The button unit 5 is fixed to the surface plate 1 by means of a bracket (not shown). A base plate 6 is fixed to the button unit 5. A plurality of light sources 7 are disposed on the base plate 6. Light-emitting diodes (LEDs), for example, are used as the light sources 7. A switch portion (not shown) that is operated by the operating button 2 is also disposed on the base plate 6.

The operating button 2 is able to reciprocate toward and away from the button unit 5. A push-button switch apparatus is constituted by the operating button 2, the button unit 5, and the switch portion. On pressing and operating the operating button 2, a destination floor is registered in an elevator controlling apparatus (not shown), and the light sources 7 of the push-button switch apparatus that is operated are lit.

The operating button 2 has: a plunger 8; a button cap 9 that is fixed to the plunger 8; and a button cover 10 that is placed over a surface of the button cap 9. The button cover 10 is made of a metal material that is identical or similar to that of the surface plate 1. In other words, a front surface of the surface plate 1 and a front surface of the operating button 2 are made of an identical or similar metal material.

The plunger 8 and the button cap 9 are made of a material that transmits light, such as a transparent or opalescent resin, for example. An aperture that is shaped like a floor number is disposed on the button cover 10. Thus, when the light sources 7 are lit, light passes through this aperture in the button cover 10, and the floor number appears to shine.

A ring-shaped prism member (a button frame) 11 is disposed between an inner peripheral surface of the button aperture 1*a* and an outer peripheral surface of the operating button 2. In Embodiment 1, the surface plate 1 is a first adjacent member that is adjacent to a first side of the prism member 11, and the operating button 2 is a second adjacent member that is adjacent to a second side of the prism member 11.

The prism member 11 is made of a transparent resin. The light sources 7 are disposed behind the prism member 11 so as to be uniformly spaced apart from each other in a circumferential direction. In addition, a tip end portion of the prism member 11 protrudes slightly outward from the button aperture 1*a*.

Figure 4:
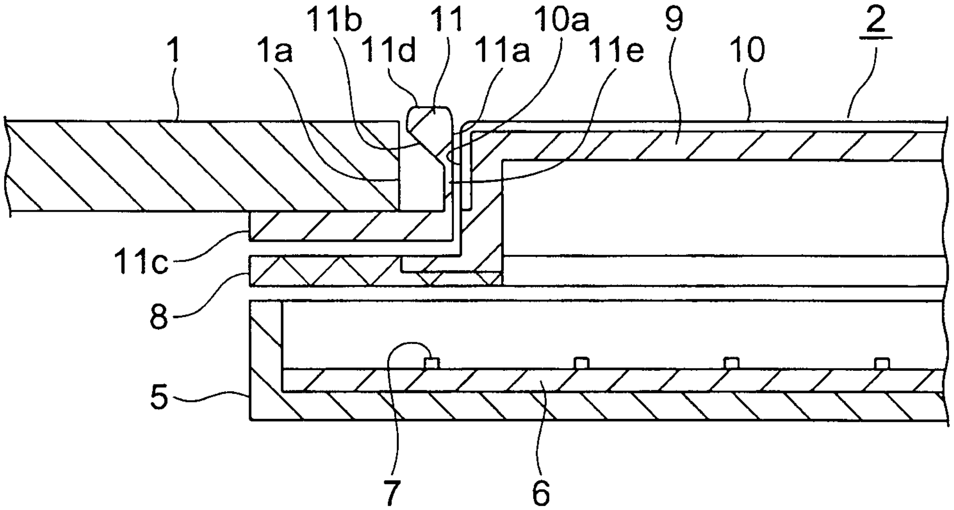
FIG. 4 is an enlarged cross section of portion IV in FIG. 3.

FIG. 4 is an enlarged cross section of portion IV in FIG. 3. The prism member 11 has: a prism member side surface 11*a* that is an inner peripheral surface; a transmitting and reflecting surface 11*b* that is inclined relative to the prism member side surface 11*a*, and into which light from the light sources 7 is admitted; a fixed portion 11*c* that is fixed to a back surface of the surface plate 1; and a prism member front surface 11*d* that is a decorative design surface that is exposed outside the operating panel.

The prism member front surface 11*d* is parallel to the front surface of the surface plate 1 and the front surface of the operating button 2. The prism member side surface 11*a* is perpendicular to the prism member front surface 11*d*. The fixed portion 11*c* is fixed to a peripheral edge portion of the button aperture 1*a*. The fixed portion 11*c* may be disposed in a flange shape so as to be continuous around an entire perimeter of the prism member 11 or may also be disposed only on a portion thereof.

The transmitting and reflecting surface 11*b* is inclined at a predetermined angle (45 degrees, for example) relative to an optical axis direction of the light sources 7 that are disposed directly below. When the light sources 7 are lit, the perimeter of the operating button 2 shines in a ring shape due to the light that is admitted through the transmitting and reflecting surface 11*b* passing through the prism member 11.

The prism member side surface 11*a* is adjacent to and faces an outer peripheral surface 10*a* of the button cover 10. In other words, the outer peripheral surface 10*a* is an adjacent surface that is adjacent to the prism member side surface 11*a*. The outer peripheral surface 10*a* is made of a metal material that is identical or similar to that of the front surface of the surface plate 1 and the front surface of the operating button 2.

When the light sources 7 are not lit, the outer peripheral surface 10*a* that is optically reflected by the transmitting and reflecting surface 11*b* is visible on the prism member front surface 11*d*. In other words, if the prism member 11 is viewed frontally when the light sources 7 are not lit, the outer peripheral surface 10*a* is visible by optical reflection at the transmitting and reflecting surface 11*b*.

In an elevator operating panel of this kind, because decorative design of the prism member 11 can be made similar to the outer peripheral surface 10*a* when the light sources 7 are not lit while maintaining a function of making the perimeter of the operating button 2 shine when the light sources 7 are lit, decorative design and decorative design freedom can be improved using a simple construction.

Costs of the prism member 11 can be reduced compared to when a metal coating (a half mirror coating, etc.) is formed on the prism member front surface 11*d*. In addition, if a metal coating is formed, it is also necessary to form a protective film to prevent peeling if handled directly, but in the prism member 11 according to Embodiment 1, deterioration can be prevented even if a protective film is not disposed.

Because the front surface of the surface plate 1, the front surface of the operating button 2, and the outer peripheral surface 10*a* are made of identical or similar materials, a sense of design uniformity can be imparted to the entire operating panel, enabling decorative design to be improved. In addition to using identical or similar materials, decorative design can also be further improved by applying identical or similar surface machining (such as hairlining or figuring), for example.

Embodiment 2

Figure 5:
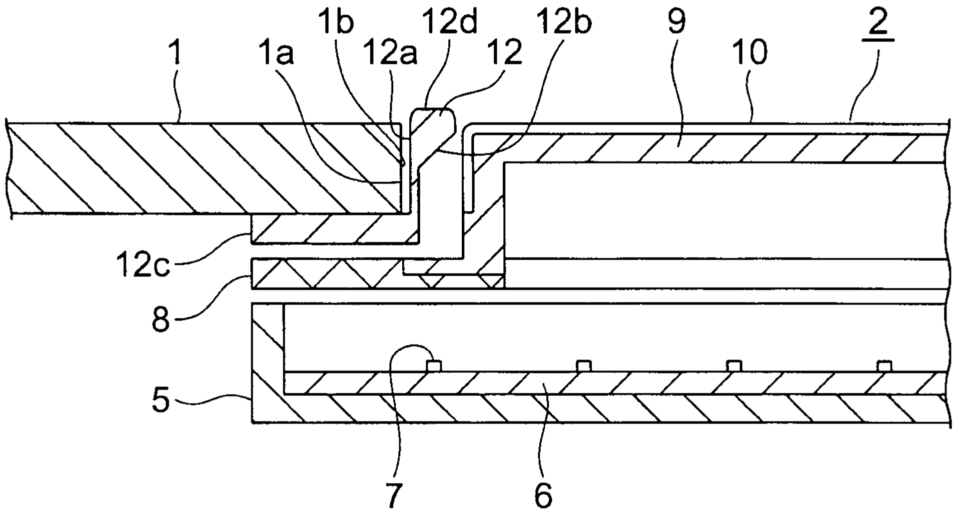
FIG. 5 is a partial cross section of an elevator operating panel according to Embodiment 2 of the present invention.

Next, FIG. 5 is a partial cross section of an elevator operating panel according to Embodiment 2 of the present invention. In Embodiment 2, a prism member side surface 11*a* and a transmitting and reflecting surface 11*b* according to Embodiment 1 are disposed in reverse. In the figure, a prism member (a button frame) 12 has: a prism member side surface 12*a* that is an outer peripheral surface; a transmitting and reflecting surface 12*b* that is inclined relative to the prism member side surface 12*a*, and into which light from light sources 7 is admitted; a fixed portion 12*c* that is fixed to a back surface of the surface plate 1; and a prism member front surface 12*d* that is a decorative design surface that is exposed outside the operating panel.

The transmitting and reflecting surface 12*b* is inclined at a predetermined angle relative to an optical axis direction of the light sources 7 that are disposed directly below. When the light sources 7 are lit, the perimeter of the operating button 2 shines in a ring shape due to the light that is admitted through the transmitting and reflecting surface 12*b* passing through the prism member 12.

The prism member side surface 12*a* is adjacent to and faces an inner peripheral surface 1*b* of a button aperture 1*a*. In other words, in Embodiment 2, the inner peripheral surface 1*b* is an adjacent surface that is adjacent to the prism member side surface 12*a*.

When the light sources 7 are not lit, the inner peripheral surface 1*b* that is optically reflected by the transmitting and reflecting surface 12*b* is visible on the prism member front surface 12*d*. In other words, if the prism member 12 is viewed frontally when the light sources 7 are not lit, the inner peripheral surface 1*b* is visible by optical reflection at the transmitting and reflecting surface 12*b*. The rest of the configuration is identical or similar to that of Embodiment 1.

Decorative design and decorative design freedom can be improved at reduced cost even if the inner peripheral surface 1*b* of the button aperture 1*a* is shown by reflection at the transmitting and reflecting surface 12*b* in this manner when the light sources 7 are not lit.

Embodiment 3

Figure 6:
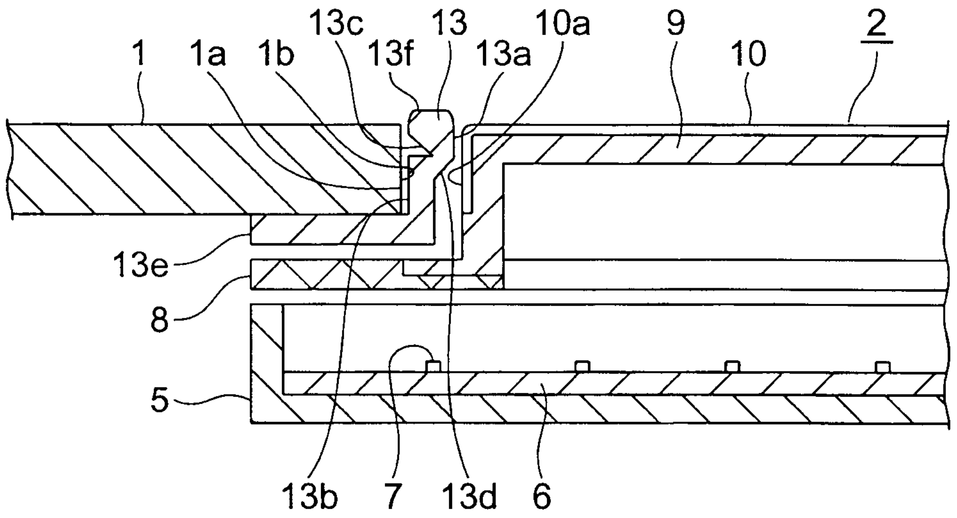
FIG. 6 is a partial cross section of an elevator operating panel according to Embodiment 3 of the present invention.

Next, FIG. 6 is a partial cross section of an elevator operating panel according to Embodiment 3 of the present invention. In the figure, a prism member (a button frame) 13 has: a first prism member side surface 13*a* that is an inner peripheral surface; a second prism member side surface 13*b* that is an outer peripheral surface; first and second transmitting and reflecting surfaces 13*c* and 13*d* that are inclined relative to the prism member side surfaces 13*a* and 13*b*, and into which light from light sources 7 is admitted; a fixed portion 13*e* that is fixed to a back surface of the surface plate 1; and a prism member front surface 13*f* that is a decorative design surface that is exposed outside the operating panel.

The first and second transmitting and reflecting surfaces 13*c* and 13*d* overlap partially with each other when viewed in the direction of transmission of light from the light sources 7. The transmitting and reflecting surfaces 13*c* and 13*d* are inclined at a predetermined angle relative to an optical axis direction of the light sources 7 that are disposed directly below. When the light sources 7 are lit, the perimeter of the operating button 2 shines in a ring shape due to the light that is admitted through the transmitting and reflecting surfaces 13*c* and 13*d* passing through the prism member 13.

The first prism member side surface 13*a* is adjacent to and faces an outer peripheral surface 10*a* of the button cover 10. The second prism member side surface 13*b* is adjacent to and faces an inner peripheral surface 1*b* of a button aperture 1*a*. In other words, in Embodiment 3, the adjacent surfaces are the outer peripheral surface 10*a* and the inner peripheral surface 1*b*.

When the light sources 7 are not lit, the outer peripheral surface 10*a* and the inner peripheral surface 1*b* that are optically reflected by the transmitting and reflecting surfaces 13*c* and 13*d* is visible on the prism member front surface 13*f*. In other words, if the prism member 13 is viewed frontally when the light sources 7 are not lit, the outer peripheral surface 10*a* and the inner peripheral surface 1*b* are visible by optical reflection at the transmitting and reflecting surfaces 13*c* and 13*d*. The rest of the configuration is identical or similar to that of Embodiment 1.

In the prism member 11 according to Embodiment 1, for example, a connecting portion 11*e* (FIG. 4) that connects the transmitting and reflecting surface 11*b* and the fixed portion 11*c* is visible when the light sources 7 are not lit. In answer to that, since the two transmitting and reflecting surfaces 13*c* and 13*d* are disposed so as to overlap partially in the prism member 13 according to Embodiment 3, the connecting portion can be hidden when the light sources 7 are not lit, enabling decorative design to be further improved.

Embodiment 4

Figure 7:
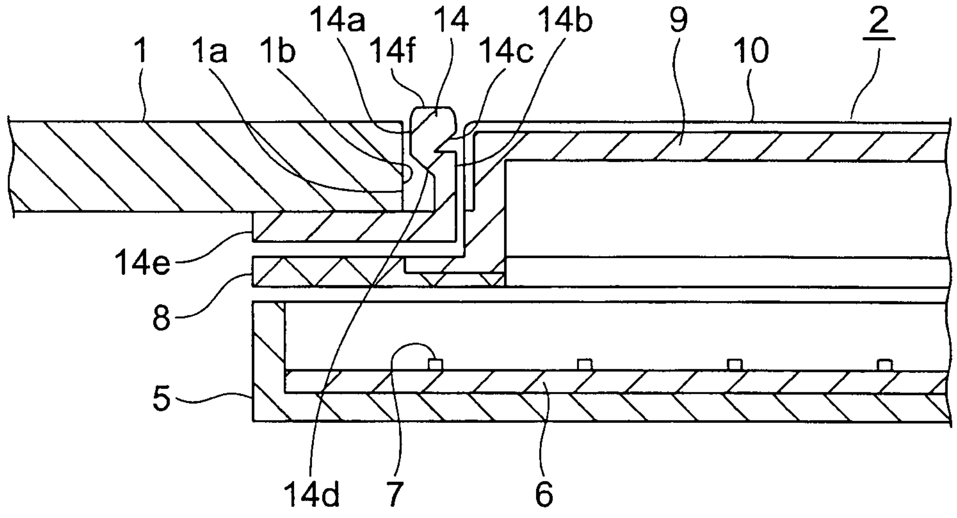
FIG. 7 is a partial cross section of an elevator operating panel according to Embodiment 4 of the present invention.

Next, FIG. 7 is a partial cross section of an elevator operating panel according to Embodiment 4 of the present invention. In Embodiment 4, prism member side surfaces 13*a* and 13*b* and transmitting and reflecting surfaces 13*c* and 13*d* according to Embodiment 3 are disposed in reverse. In the figure, a prism member (a button frame) 14 has: a first prism member side surface 14*a* that is an outer peripheral surface; a second prism member side surface 14*b* that is an inner peripheral surface; first and second transmitting and reflecting surfaces 14*c* and 14*d* that are inclined relative to the prism member side surfaces 14*a* and 14*b*, and into which light from light sources 7 is admitted; a fixed portion 14*e* that is fixed to a back surface of the surface plate 1; and a prism member front surface 14*f* that is a decorative design surface that is exposed outside the operating panel. The rest of the configuration is identical or similar to that of Embodiment 3.

Using a configuration of this kind, the connecting portion can also be hidden when the light sources 7 are not lit, enabling decorative design to be further improved.

Embodiment 5

Figure 8:
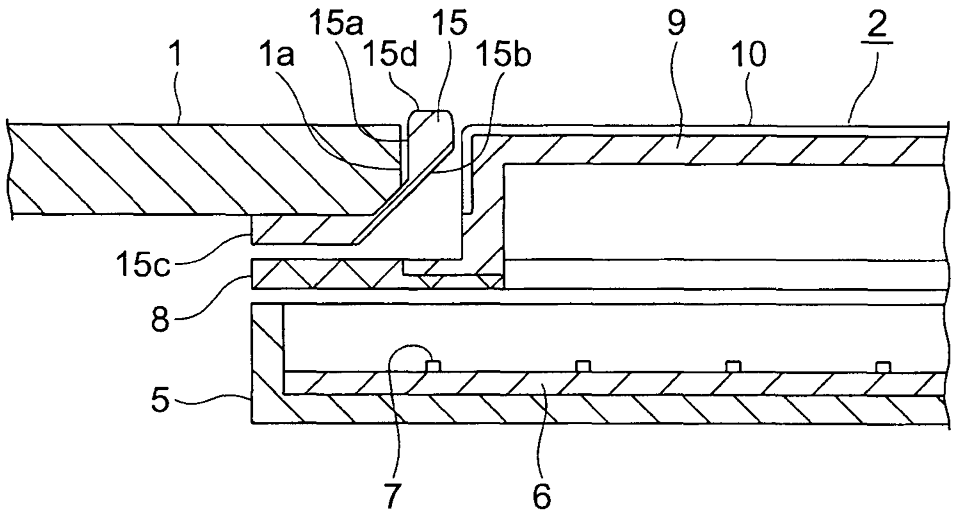
FIG. 8 is a partial cross section of an elevator operating panel according to Embodiment 5 of the present invention.

Next, FIG. 8 is a partial cross section of an elevator operating panel according to Embodiment 5 of the present invention. In Embodiment 5, the transmitting and reflecting surface 12*b* according to Embodiment 2 is extended to the back of the surface plate 1. A prism member (a button frame) 15 has: a prism member side surface 15*a* that is an outer peripheral surface; a transmitting and reflecting surface 15*b* that is inclined relative to the prism member side surface 15*a*, and into which light from light sources 7 is admitted; a fixed portion 15*c* that is fixed to a back surface of the surface plate 1; and a prism member front surface 15*d* that is a decorative design surface that is exposed outside the operating panel. The transmitting and reflecting surface 15*b* is disposed continuously from an inner peripheral edge of the prism member 15 to a back portion of the surface plate 1. The rest of the configuration is identical or similar to that of Embodiment 2.

The connecting portion can also be hidden when the light sources 7 are not lit by extending the transmitting and reflecting surface 15*b* to the back portion of the surface plate 1 in this manner, enabling decorative design to be further improved.

Embodiment 6

Figure 9:
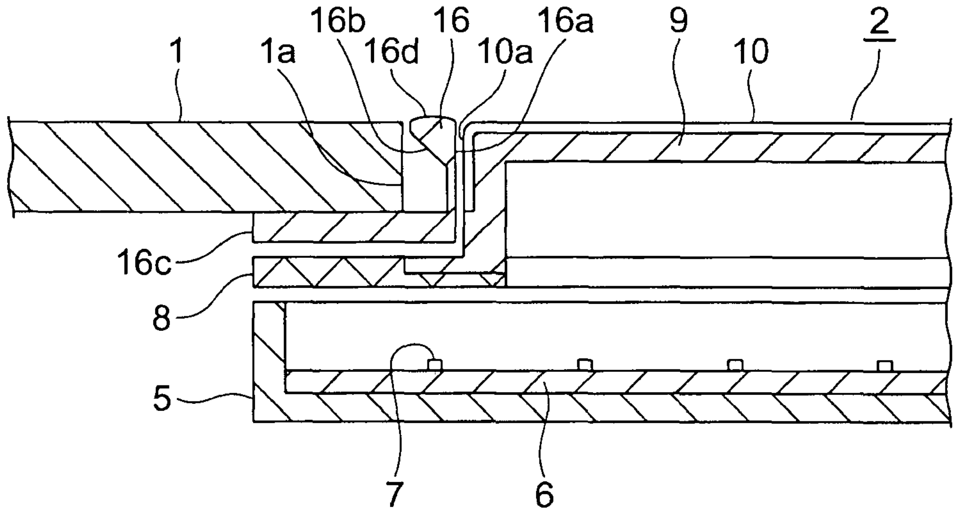
FIG. 9 is a partial cross section of an elevator operating panel according to Embodiment 6 of the present invention.

Next, FIG. 9 is a partial cross section of an elevator operating panel according to Embodiment 6 of the present invention. In Embodiment 6, the prism member front surface 11*d* according to Embodiment 1 is curved such that a center of a cross section thereof protrudes. In the figure, a prism member (a button frame) 16 has: a prism member side surface 16*a* that is an inner peripheral surface; a transmitting and reflecting surface 16*b* that is inclined relative to the prism member side surface 16*a*, and into which light from light sources 7 is admitted; a fixed portion 16*c* that is fixed to a back surface of the surface plate 1; and a prism member front surface 16*d* that is a decorative design surface that is exposed outside the operating panel.

A cross section of the prism member front surface 16*d* is curved into a circular arc shape such that a center thereof protrudes. The rest of the configuration is identical or similar to that of Embodiment 1.

By curving the prism member front surface 16*d* in this manner, some regions of the transmitting and reflecting surface 16*b* are visible on the prism member front surface 16*d* so as to be enlarged when the light sources 7 are not lit. Because of this, the connecting portion can be hidden when the light sources 7 are not lit, enabling decorative design to be further improved.

Moreover, in Embodiment 6, the cross section of the prism member front surface 16*d* is curved into a circular arc shape such that the center thereof protrudes, but may also be curved into a concave circular arc shape such that the center is formed into a hollow.

Embodiment 7

Figure 10:
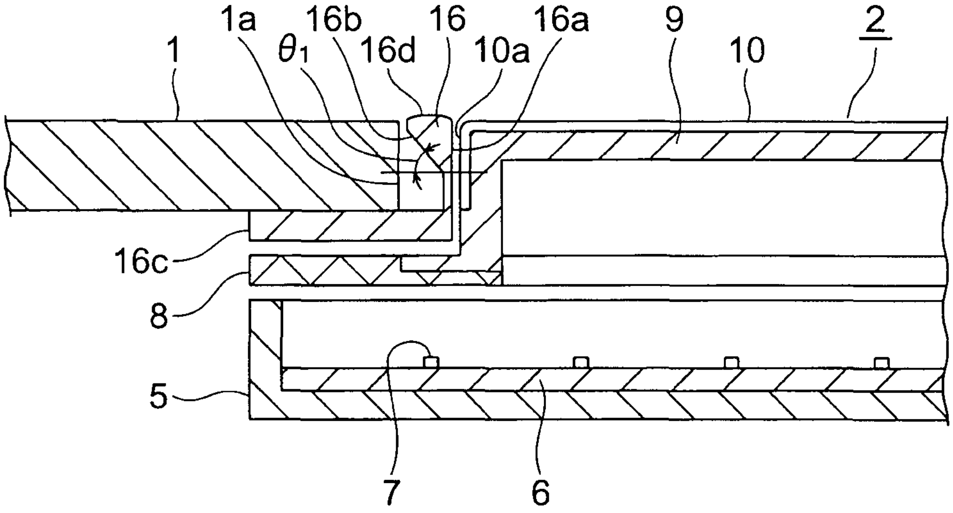
FIG. 10 is a partial cross section of an elevator operating panel according to Embodiment 7 of the present invention.

Next, FIG. 10 is a partial cross section of an elevator operating panel according to Embodiment 7 of the present invention. In this example, an angle of inclination θ1 of a transmitting and reflecting surface 16*b* relative to a plane that is perpendicular to an optical axis direction of light sources 7 that are disposed directly below the transmitting and reflecting surface 16*b* is greater than in Embodiment 6 (θ1>45 degrees, for example). In other words, a thickness between a prism member front surface 16*a* and the transmitting and reflecting surface 16*b* is thinner, and the angle of inclination θ1 of the transmitting and reflecting surface 16*b* is greater on a side where the transmitting and reflecting surface 16*b* and the prism member front surface 16*a* are closer to being parallel to each other. The rest of the configuration is identical or similar to that of Embodiment 6.

Using a configuration of this kind, the connecting portion can also be hidden when the light sources 7 are not lit even if the thickness of the connecting portion is somewhat thicker, enabling decorative design to be further improved.

Embodiment 8

Figure 11:
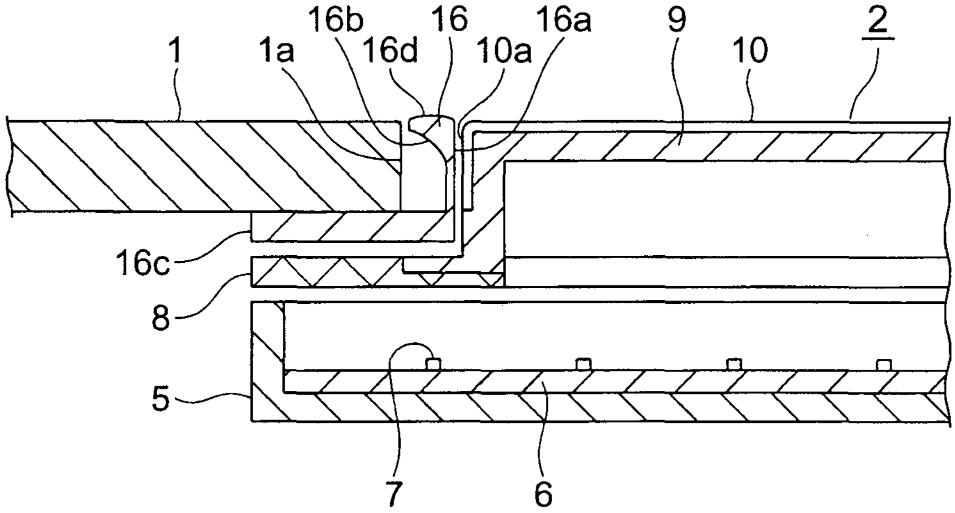
FIG. 11 is a partial cross section of an elevator operating panel according to Embodiment 8 of the present invention.

Next, FIG. 11 is a partial cross section of an elevator operating panel according to Embodiment 8 of the present invention. In the figure, a transmitting and reflecting surface 16*b* is curved into a circular arc shape such that a center of a cross section thereof is formed into a hollow. The rest of the configuration is identical or similar to that of Embodiment 6.

Using a configuration of this kind, the connecting portion can also be hidden when the light sources 7 are not lit even if the thickness of the connecting portion is somewhat thicker, enabling decorative design to be further improved.

Moreover, the radii of curvature of the cross sections of the prism member front surface 16*a* and the transmitting and reflecting surface 16*b* are set to correspond appropriately to the thickness of the connecting portion. By curving the cross sections of the prism member front surface 16*a* and the transmitting and reflecting surface 16*b*, the adjacent surface can be made to look larger or smaller as required, thereby also enabling decorative design freedom to be improved.

Embodiment 9

Figure 12:
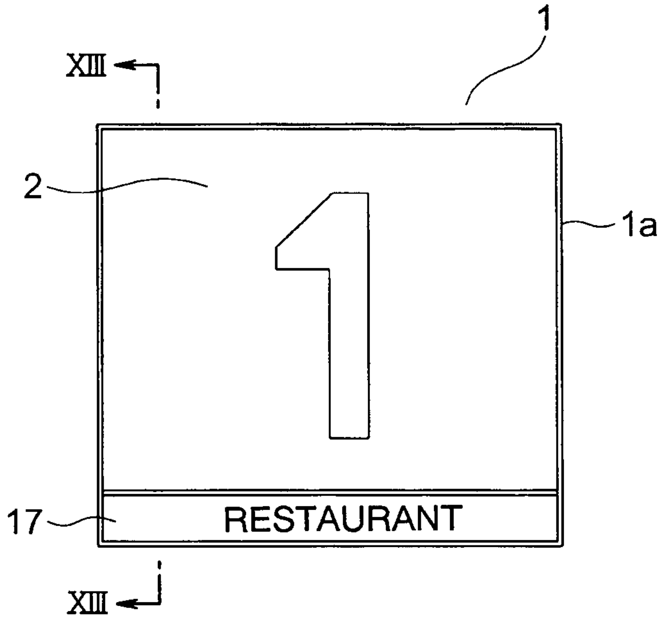
FIG. 12 is a front elevation that shows an operating button of an elevator operating panel according to Embodiment 9 of the present invention.
Figure 13:
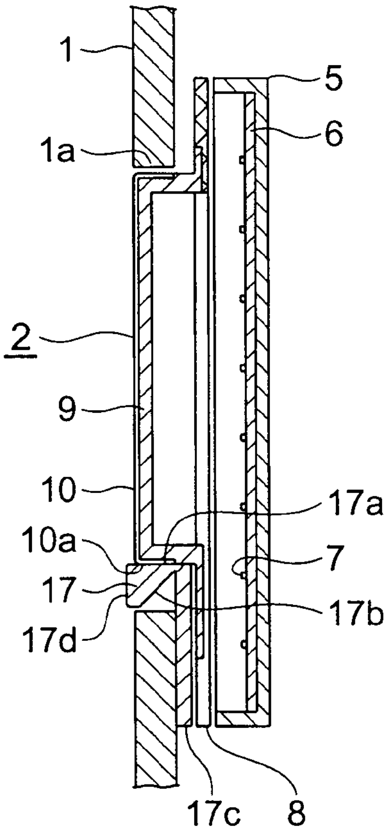
FIG. 13 is a cross section that is taken along line XIII-XIII in FIG. 12.

Next, FIG. 12 is a front elevation that shows an operating button of an elevator operating panel according to Embodiment 9 of the present invention, and FIG. 13 is a cross section that is taken along line XIII-XIII in FIG. 12. In Embodiment 9, a rectangular operating button 2 is used. A bar-shaped prism member 17 is disposed between a lower side of a portion of the operating button 2 that is inserted into a button aperture 1*a* and an edge portion of the button aperture 1*a*. The prism member 17 is made of a transparent resin.

The prism member 17 has: a prism member side surface 17*a* that is an upper surface; a transmitting and reflecting surface 17*b* that is inclined relative to the prism member side surface 17*a*, and into which light from light sources 7 is admitted; a fixed portion 17*c* that is fixed to a back surface of the surface plate 1; and a prism member front surface 17*d* that is a decorative design surface that is exposed outside the operating panel.

The prism member front surface 17*d* is parallel to the front surface of the surface plate 1 and the front surface of the operating button 2. The prism member side surface 17*a* is perpendicular to the prism member front surface 17*d*. The fixed portion 17*c* is fixed to an edge portion of the button aperture 1*a*. The fixed portion 17*c* may be disposed so as to be continuous along an entire length of the prism member 17 or may also be disposed only on a portion thereof.

The transmitting and reflecting surface 17*b* is inclined at a predetermined angle relative to an optical axis direction of the light sources 7 that are disposed directly below. When the light sources 7 are lit, a lower portion of the operating button 2 shines due to the light that is admitted through the transmitting and reflecting surface 17*b* passing through the prism member 17.

The prism member side surface 17*a* is adjacent to and faces an outer peripheral surface 10*a* of a button cover 10. In other words, in Embodiment 9, the outer peripheral surface 10*a* is an adjacent surface that is adjacent to the prism member side surface 17*a*. Letters are applied to the outer peripheral surface 10*a* by printing or engraving, etc. In this case, information that relates to a building floor, "RESTAURANT", for example, is printed as characters that are applied to the outer peripheral surface 10*a*.

When the light sources 7 are not lit, the outer peripheral surface 10*a* that is optically reflected by the transmitting and reflecting surface 17*b* is visible on the prism member front surface 17*d*. In other words, if the prism member 17 is viewed frontally when the light sources 7 are not lit, the outer peripheral surface 10*a* is visible by optical reflection at the transmitting and reflecting surface 17*b*. Because of this, the characters "RESTAURANT" are also visible on the prism member front surface 17*d* when the light sources 7 are not lit.

By reflecting and displaying on the prism member front surface 17*d* characters that are applied to the outer peripheral surface 10*a* in this manner, it is no longer necessary to dispose the characters on the prism member 17 itself, enabling decorative design when the light sources 7 are lit to be improved. Since users do not touch the characters directly, the characters can be prevented from peeling off or fading, enabling decorative design to be maintained for a long period.

Moreover, tenant names, for example, may also be printed as the information that relates to the building floors.

The outer peripheral surface 10*a* may also be colored, or a colored pattern or a pattern using machining (hairlining, etc.) applied, either instead of the characters or in addition to the characters, and that color or pattern can be shown when the light sources 7 are not lit, enabling decorative design freedom to be improved.

Now, in Embodiment 1, a sense of design uniformity was imparted by making the material of the outer peripheral surface 10*a* identical or similar to that of the front surface of the surface plate 1 and the front surface of the operating button 2, but the visibility of the operating button 2 can also conversely be increased by making the material or decorative design of the adjacent surface different than that of the front surface of the surface plate 1 and the front surface of the operating button 2.

In addition, Embodiments 1 through 9 may also be implemented in combination with each other as required. For example, in Embodiments 1 through 8, characters, color, pattern, etc., may also be applied to the adjacent surface. In other words, a decorative design that is different than that of the front surface of the adjacent member may also be disposed on the adjacent surface. The prism member front surface 17*d* and the transmitting and reflecting surface 17*b* according to Embodiment 9 may also be curved.

The prism members 11 through 16 according to Embodiments 1 through 8 may also be disposed only on a portion of the outer perimeter of the operating button 2, or may also be divided circumferentially.

The prism member 17 according to Embodiment 9 may also be disposed around the entire perimeter of the operating button 2, or may also be disposed on another side thereof.

Embodiment 10

Figure 14:
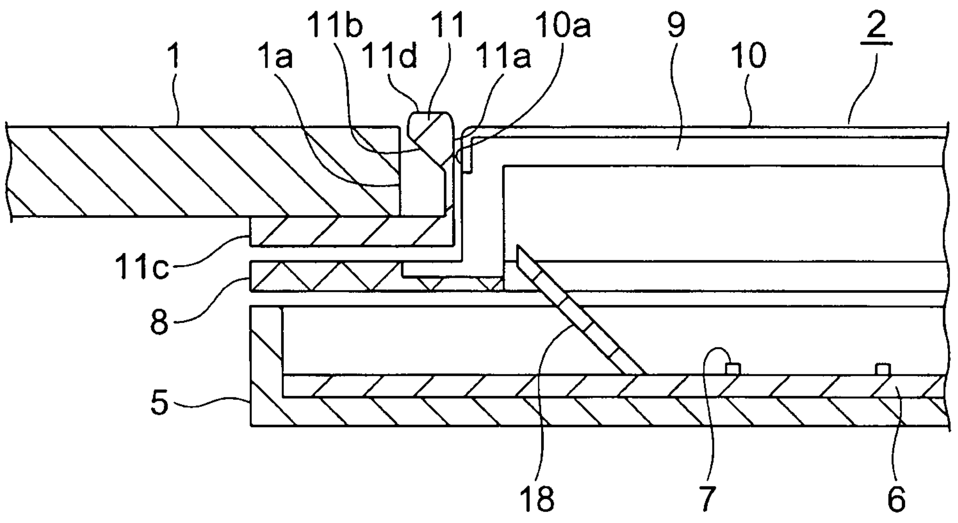
FIG. 14 is a partial cross section of an elevator operating panel according to Embodiment 10 of the present invention.

Next, FIG. 14 is a partial cross section of an elevator operating panel according to Embodiment 10 of the present invention. In this example, light sources 7 are not disposed directly below a prism member 11, but light from the light sources 7 is reflected by a reflector 18 that constitutes a light-directing member on a base plate 6, and is directed to the prism member 11. The rest of the configuration is identical or similar to that of Embodiment 1.

Using a configuration of this kind, disposing light sources 7 directly below the prism member 11 can be dispensed with, enabling costs to be reduced by reducing the number of light sources 7.

Moreover, the light-directing member is not limited to the reflector 18, and may also be a member that diffuses light passing through internally.

A light-directing member such as that shown in Embodiment 10 may also be applied to the configurations of Embodiments 2 through 8.

Embodiment 11

Figure 15:
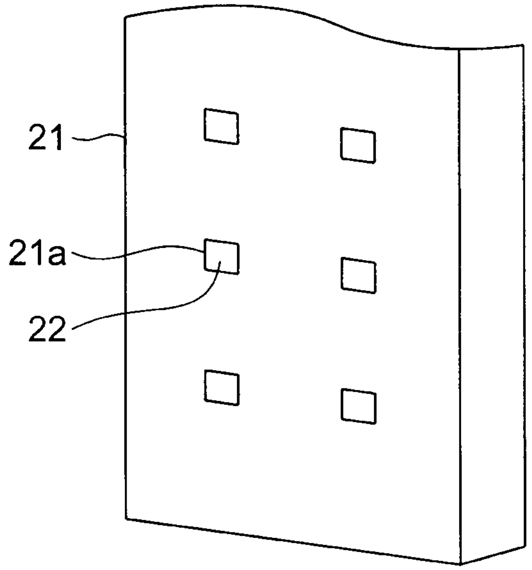
FIG. 15 is a perspective that shows an indicator apparatus according to Embodiment 11 of the present invention.

Next, FIG. 15 is a perspective that shows an indicator apparatus according to Embodiment 11 of the present invention. In the figure, a plurality of rectangular apertures 21*a* is disposed on a surface plate 21. A prism member 22 is disposed on each of the apertures 21*a*. The prism members 22 are made of a transparent resin.

Figure 16:
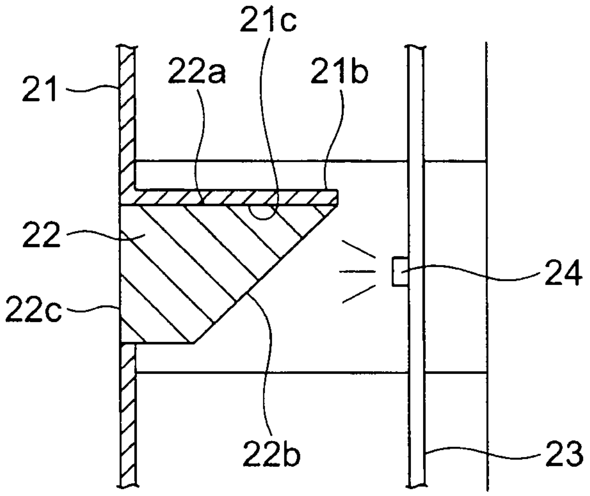
FIG. 16 is a partial cross section of FIG. 15.

FIG. 16 is a partial cross section of FIG. 15. A base plate 23 is disposed behind the surface plate 21. A plurality of light sources 24 that face the prism members 22 are disposed on the base plate 23. LEDs, for example, are used as the light sources 24. These light sources 24 are switched on and off in response to states of corresponding equipment, such as the ON/OFF state of the electric power supply, for example.

Tabular salient portions 21*b* that protrude perpendicularly to the front surface of the surface plate 21 are disposed on edge portions of the apertures 21*a* on a rear surface of the surface plate 21. The prism members 22 are fixed to the salient portions 21*b*.

In addition, the prism members 22 have: a prism member side surface 22*a* that is an upper surface; a transmitting and reflecting surface 22*b* that is inclined relative to the prism member side surface 22*a*, and into which light from light sources 24 is admitted; and a prism member front surface 22*c* that is a decorative design surface that is exposed externally through the apertures 21*a*. The prism member front surface 22*d* is parallel to (in this case, flush with) the front surface of the surface plate 21. The prism member side surface 22*a* is perpendicular to the prism member front surface 22*c*.

The transmitting and reflecting surface 22*b* is inclined at a predetermined angle (45 degrees, for example) relative to an optical axis direction of the light sources 24 that are disposed directly below. When the light sources 24 are lit, the perimeter of the prism member front surface 22*c* shines due to the light that is admitted through the transmitting and reflecting surface 22*b* passing through the prism member 22.

The prism member side surfaces 22*a* are adjacent to and joined to lower surfaces 21*c* of the salient portions 21*b*. In other words, in Embodiment 11, the adjacent member is the surface plate 21, and the adjacent surface that is adjacent to the prism member side surface 22*a* is the lower surface 21*c*.

The lower surface 21*c* is made of a metal material that is identical or similar to that of the front surface of the surface plate 21.

When the light sources 24 are not lit, the lower surface 21*c* that is optically reflected by the transmitting and reflecting surface 22*b* is visible on the prism member front surface 22*c*. In other words, if the prism member 22 is viewed frontally when the light sources 24 are not lit, the lower surface 21*c* is visible by optical reflection at the transmitting and reflecting surface 22*b*.

In an indicator apparatus of this kind, because decorative design of the prism members 22 can be made similar to the lower surfaces 21*c* of the salient portions 21*b* when the light sources 24 are not lit while maintaining a function of making the prism members 22 shine when the light sources 24 are lit, decorative design and decorative design freedom can be improved using a simple construction.

Costs of the prism members 22 can be reduced compared to when a metal coating (a half mirror coating, etc.) is formed on the prism member front surface 22*c*. In addition, if a metal coating is formed, it is also necessary to form a protective film to prevent peeling if handled directly, but in the prism member 22 according to Embodiment 11 deterioration can be prevented even if a protective film is not disposed.

Because the front surface of the surface plate 21 and the lower surfaces 21*c* of the salient portions 21*b* are made of identical or similar materials, a sense of design uniformity can be imparted to the entire indicator apparatus, enabling decorative design to be improved.

Moreover, in Embodiment 11, prism members 22 that have a rectangular frontal shape are shown, but the frontal shape of the prism members 22 is not limited to this, and may also be circular, or ring-shaped as shown in Embodiment 1, for example.

Configurations such as those shown in Embodiments 3 through 10 may also be combined with the type of indicator apparatus that is shown in Embodiment 11. For example, the prism member front surface 22*c* may also be curved into a circular arc shape. Letters, color, pattern, etc., may also be applied to the lower surfaces 21*c* of the salient portions 21*b*. In other words, a decorative design that is different than that of the front surface of the surface plate 21 may also be disposed on the lower surfaces 21*c*.

Embodiment 12

Figure 17:
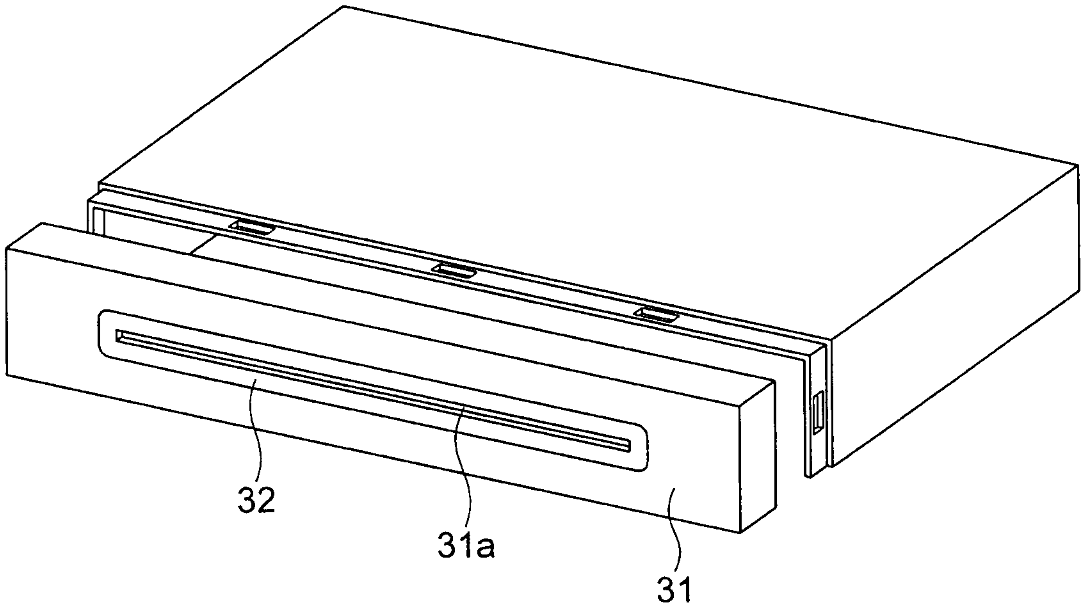
FIG. 17 is a perspective that shows a card slot indicator apparatus according to Embodiment 12 of the present invention.

Next, FIG. 17 is a perspective that shows a card slot indicator apparatus according to Embodiment 12 of the present invention. This card slot indicator apparatus is disposed on equipment that is mounted inside automobiles (such as car audio systems, etc.) in order to facilitate recognition of a recording media insertion aperture in darkness, for example. In the figure, an insertion aperture 31*a* into which a card-type or disc-type recording medium is inserted is disposed on a front panel 31. A prism member 32 is disposed around a perimeter of the insertion aperture 31*a*. The prism member 32 is made of a transparent resin.

Figure 18:
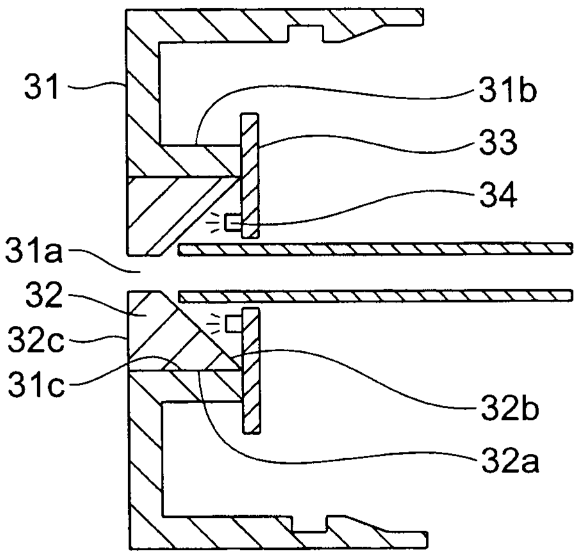
FIG. 18 is a cross section of the card slot indicator apparatus in FIG. 17.

FIG. 18 is a cross section of the card slot indicator apparatus in FIG. 17. A base plate 33 is disposed behind the front panel 31. A plurality of light sources 34 that face the prism member 32 are disposed on the base plate 33. LEDs, for example, are used as the light sources 34. The light sources 34 are switched on and off in response to an insertion state of the recording media, or by operating a special switch, together with the operation of headlights of the automobile.

A tubular salient portion 31*b* that protrudes perpendicularly to the front surface of the front panel 31 is disposed on a rear surface of the front panel 31. The prism member 32 is fixed inside the salient portion 31*b*.

The prism member 32 has: a prism member side surface 32*a* that is an outer peripheral surface; a transmitting and reflecting surface 32*b* that is inclined relative to the prism member side surface 32*a*, and into which light from the light sources 34 is admitted; and a prism member front surface 32*c* that is a decorative design surface that is exposed externally through the front surface of the front panel 31. The prism member front surface 32*c* is parallel to (in this case, flush with) the front surface of the front panel 31. The prism member side surface 32*a* is perpendicular to the prism member front surface 32*c*.

The transmitting and reflecting surface 32*b* is inclined at a predetermined angle (45 degrees, for example) relative to an optical axis direction of the light sources 34 that are disposed directly below. When the light sources 34 are lit, the perimeter of the prism member front surface 32*c* shines due to the light that is admitted through the transmitting and reflecting surface 32*b* passing through the prism member 32.

The prism member side surface 32*a* is adjacent to and joined to an inner surface 31*c* of the salient portion 31*b*. In other words, in Embodiment 12, the adjacent member is the front panel 31, and the adjacent surface that is adjacent to the prism member side surface 32*a* is the inner surface 31*c*. The inner surface 31*c* is made of a metal material that is identical or similar to that of the front surface of the front panel 31.

When the light sources 34 are not lit, the inner surface 31*c* that is optically reflected by the transmitting and reflecting surface 32*b* is visible on the prism member front surface 32*c*. In other words, if the prism member 32 is viewed frontally when the light sources 34 are not lit, the inner surface 31*c* is visible by optical reflection at the transmitting and reflecting surface 32*b*.

In an indicator apparatus of this kind, because decorative design of the prism member 32 can be made similar to the inner surface 31*c* of the salient portion 31*b* when the light sources 34 are not lit while maintaining a function of making the prism member 32 shine when the light sources 34 are lit, decorative design and decorative design freedom can be improved using a simple construction.

Costs of the prism member 32 can be reduced compared to when a metal coating (a half mirror coating, etc.) is formed on the prism member front surface 32*c*. In addition, if a metal coating is formed, it is also necessary to form a protective film to prevent peeling if contacted by a hand or a recording medium, but in the prism member 32 according to Embodiment 12 deterioration can be prevented even if a protective film is not disposed.

Because the front surface of the front panel 31 and the inner surface 31*c* of the salient portion 31*b* are made of identical or similar materials, a sense of design uniformity can be imparted to the entire indicator apparatus, enabling decorative design to be improved.

Moreover, in Embodiment 12, the prism member 32 is disposed so as to surround the insertion aperture 31*a*, but may also be disposed on only a portion of the perimeter of the insertion aperture 31*a*, such as only above or below, for example.

A plurality of prism members may also be disposed so as to be spaced apart from each other around the entire perimeter or on a portion of the perimeter of the insertion aperture 31*a*.

In addition, configurations such as those shown in Embodiments 3 through 10 may also be combined with the type of card slot indicator apparatus that is shown in Embodiment 12. For example, the prism member front surface 32*c* may also be curved into a circular arc shape. Letters, color, pattern, etc., may also be applied to the inner surface 31*c* of the salient portion 31*b*. In other words, a decorative design that is different than that of the front surface of the front panel 31 may also be disposed on the inner surface 31*c*.

Furthermore, a card slot indicator apparatus according to Embodiment 12 may also be disposed on a reading apparatus that reads information from recording media, or may also be disposed on a reading and writing apparatus that records information on recording media.

Equipment that is mounted to an automobile is merely an example, and the present invention can be applied to card slot indicator apparatuses on any type of equipment.

Embodiment 13

Figure 19:
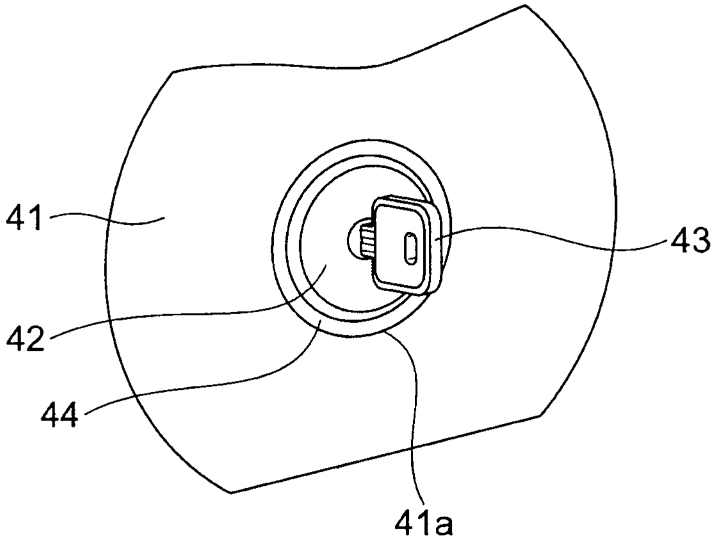
FIG. 19 is a perspective that shows a keyhole indicator apparatus according to Embodiment 13 of the present invention.

Next, FIG. 19 is a perspective that shows a keyhole indicator apparatus according to Embodiment 13 of the present invention. This keyhole indicator apparatus is disposed on an automobile key insertion portion in order to facilitate recognition of a key insertion aperture in darkness, for example. In the figure, a circular key cylinder mounting aperture 41*a* is disposed on a surface plate 41. A key cylinder 42 is disposed inside the key cylinder mounting aperture 41*a*. A key 43 is inserted into the key cylinder 42.

A ring-shaped prism member (a cylinder frame) 44 is disposed between an inner peripheral surface of the key cylinder mounting aperture 41*a* and an outer peripheral surface of the key cylinder 42. The prism member 44 is made of a transparent resin.

Figure 20:
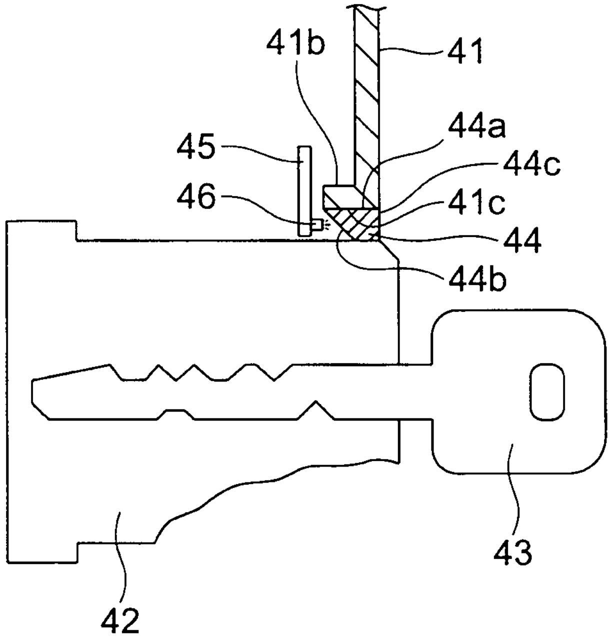
FIG. 20 is a cross section of the keyhole indicator apparatus in FIG. 19.

FIG. 20 is a cross section of the keyhole indicator apparatus in FIG. 19. A base plate 45 is disposed behind the surface plate 41. A plurality of light sources 46 that face the prism member 44 are disposed on the base plate 45. LEDs, for example, are used as the light sources 46. The light sources 46 are switched on and off in response to an insertion state of the key, or by operating a special switch, together with the operation of headlights of the automobile.

A tubular salient portion 41*b* that protrudes perpendicularly to the front surface of the surface plate 41 is disposed on a rear surface of the surface plate 41. The prism member 44 is fixed inside the salient portion 41*b*.

The prism member 44 has: a prism member side surface 44*a* that is an outer peripheral surface; a transmitting and reflecting surface 44*b* that is inclined relative to the prism member side surface 44*a*, and into which light from the light sources 46 is admitted; and a prism member front surface 44*c* that is a decorative design surface that is exposed externally through the front surface of the surface plate 41. The prism member front surface 44*c* is parallel to (in this case, flush with) the front surface of the surface plate 41. The prism member side surface 44*a* is perpendicular to the prism member front surface 44*c*.

The transmitting and reflecting surface 44*b* is inclined at a predetermined angle (45 degrees, for example) relative to an optical axis direction of the light sources 46 that are disposed directly below. When the light sources 46 are lit, the perimeter of the prism member front surface 44*c* shines due to the light that is admitted through the transmitting and reflecting surface 44*b* passing through the prism member 44.

The prism member side surface 44*a* is adjacent to and joined to an inner peripheral surface 41*c* of the salient portion 41*b*. In other words, in Embodiment 13, the adjacent member is the surface plate 41, and the adjacent surface that is adjacent to the prism member side surface 44*a* is the inner peripheral surface 41*c*. The inner peripheral surface 41*c* is made of a metal material that is identical or similar to that of the front surface of the surface plate 41.

When the light sources 46 are not lit, the inner peripheral surface 41*c* that is optically reflected by the transmitting and reflecting surface 44*b* is visible on the prism member front surface 44*c*. In other words, if the prism member 44 is viewed frontally when the light sources 46 are not lit, the inner peripheral surface 41*c* is visible by optical reflection at the transmitting and reflecting surface 44*b*.

In an indicator apparatus of this kind, because decorative design of the prism member 44 can be made similar to the inner peripheral surface 41*c* of the salient portion 41*b* when the light sources 46 are not lit while maintaining a function of making the prism member 44 shine when the light sources 46 are lit, decorative design and decorative design freedom can be improved using a simple construction.

Costs of the prism member 44 can be reduced compared to when a metal coating (a half mirror coating, etc.) is formed on the prism member front surface 44*c*. In addition, if a metal coating is formed, it is also necessary to form a protective film to prevent peeling if contacted by a hand or a key, but in the prism member 44 according to Embodiment 13 deterioration can be prevented even if a protective film is not disposed.

Because the front surface of the surface plate 41 and the inner peripheral surface 41*c* of the salient portion 41*b* are made of identical or similar materials, a sense of design uniformity can be imparted to the entire indicator apparatus, enabling decorative design to be improved.

Moreover, in Embodiment 13, the prism member 44 is disposed so as to surround the key cylinder 42, but may also be disposed on only a portion of the perimeter of the key cylinder 42.

A plurality of prism members may also be disposed so as to be spaced apart from each other around the entire perimeter or on a portion of the perimeter of the key cylinder 42.

In addition, configurations such as those shown in Embodiments 3 through 10 may also be combined with the type of keyhole indicator apparatus that is shown in Embodiment 13. For example, the prism member front surface 44*c* may also be curved into a circular arc shape. Letters, color, pattern, etc., may also be applied to the inner peripheral surface 41*c* of the salient portion 41*b*. In other words, a decorative design that is different than that of the front surface of the surface plate 41 may also be disposed on the inner peripheral surface 41*c*. In addition, the adjacent surface may also be disposed on a side of the key cylinder 42, or adjacent surfaces may also be disposed on both the surface plate 41 and the key cylinder 42.

Furthermore, a keyhole indicator apparatus that is mounted to an automobile is merely an example, and the present invention can be applied to keyhole indicator apparatuses on any type of equipment or building.

In Embodiments 1 through 13, abrasive blasting may also be applied to the prism member front surface. In that case, light can be shone uniformly when the light sources are lit, and the decorative design when the light sources are not lit can also be improved.

In addition, in Embodiments 1 through 13, the material of the prism member is not limited to a resin, and may also be glass, for example.

Furthermore, in Embodiments 1 through 13, the adjacent member may also be a film or a sheet that is bonded to the prism member side surface.

Here, because the adjacent surface is totally reflected on emission from the prism member if set to greater than a critical angle θc, it is preferable to set the angle of inclination θ1 of the transmitting and reflecting surface (see FIG. 10) according to the following expression. Here, n is an index of refraction specific to the material of the prism member, e.g. approximately 1.49 for an acrylic, and approximately 1.58 for a polycarbonate.

$$\theta 1 > \theta c = \sin^{-1}(1/n)$$

If the prism member is made of an acrylic, light is totally reflected at greater than or equal to an angle of incidence of 42.2 degrees, and if made of a polycarbonate, light is totally reflected at greater than or equal to an angle of incidence of 39.9 degrees. Because of this, it is preferable to set the angle of inclination θ1 of the transmitting and reflecting surface to greater than 42.2 degrees for an acrylic, and greater than 39.9 degrees for a polycarbonate.

The invention claimed is:

1. An indicator apparatus comprising:

a light source;

a prism member comprising:

an exterior facing surface which is a front surface of the prism;

a prism member side surface; and a transmitting and reflecting surface that is inclined relative to the prism member side surface, and into which light is admitted from the light source, the inclined transmitting and reflecting surface including an inclined first side facing an exterior of the prism member and an inclined second side facing an interior of the prism member, the prism member transmitting through the front surface the light from the light source; and an adjacent member that has an adjacent surface that is spaced apart from and immediately adjacent to the prism member side surface in a direction substantially perpendicular to a direction of transmission of light from the light source, wherein light from the light source enters the prism member through the inclined first side of the transmitting and reflecting surface when the light source is lit, and wherein the adjacent surface is visible through the front surface of the prism member due to optical reflection at the inclined second side of the transmitting and reflecting surface, which is opposite to the first side of the transmitting and reflecting surface, so that the adjacent surface is visible through the front surface of the prism member if the prism member is viewed frontally when the light source is not lit, wherein the adjacent member includes first and second adjacent members, the first adjacent member is a surface plate that has a button aperture, and the second adjacent member is an operating button that is disposed in the button aperture, and that is operated by a user, the adjacent surface being disposed on at least one of the first and second adjacent members, and the prism member being disposed between the first and second adjacent members, and wherein a plane formed perpendicular to the direction of transmission of light from the light source extends through each of the first adjacent member, the second adjacent member, the adjacent surface, the prism member side surface, and the transmitting and reflecting surface.

2. The indicator apparatus according to claim 1, wherein a front surface of the first adjacent member, a front surface of the second adjacent member, and the adjacent surface are made of identical or similar materials.

3. The indicator apparatus according to claim 2, wherein identical or similar surface machining is applied to the front surface of the first adjacent member, the front surface of the second adjacent member, and the adjacent surface.

4. The indicator apparatus according to claim 1, wherein:

the prism member further comprises a fixed portion that is fixed to a back surface of the surface plate;

the adjacent surface is disposed on an outer peripheral surface of the operating button and an inner peripheral surface of the button aperture;

the transmitting and reflecting surface includes first and second transmitting and reflecting surfaces that reflect the inner peripheral surface of the button aperture and the outer peripheral surface of the operating button when the light source is not lit; and the first and second transmitting and reflecting surfaces overlap partially with each other when viewed in the direction of transmission of light from the light source.

5. The indicator apparatus according to claim 1, wherein:

the prism member further comprises a fixed portion that is fixed to a back surface of the surface plate; and the transmitting and reflecting surface is extended from the back portion of the surface plate.

6. The indicator apparatus according to claim 1, wherein:

a cross-sectional shape of at least one of the front surface of the prism member that is exposed externally and the transmitting and reflecting surface is curved into an arc shape.

7. The indicator apparatus according to claim 1, wherein a character is applied to the adjacent surface.

8. The indicator apparatus according to claim 1, wherein a different decorative design is disposed on the adjacent surface than a decorative design on a front surface of the adjacent member.

9. The indicator apparatus according to claim 1, further comprising a light-directing member that directs light from the light source to the prism member.

10. The indicator apparatus according to claim 1, wherein:

abrasive blasting is applied to the front surface of the prism member that is exposed externally.

11. The indicator apparatus according to claim 1, wherein:

the adjacent member is a front panel in which is disposed an insertion aperture into which a recording medium is inserted; and the prism member is disposed on at least a portion of a perimeter of the insertion aperture.

12. The indicator apparatus according to claim 1, wherein:

the adjacent member is a surface plate that has a key cylinder mounting aperture; and the prism member is disposed between the surface plate and a key cylinder into which a key is inserted that is disposed on the key cylinder mounting aperture.

13. The indicator apparatus according to claim 1, wherein the transmitting and reflecting surface is inclined relative to the prism member side surface at an angle of 45 degrees.

* * * * *